United States Patent
Srinivasa et al.

(10) Patent No.: US 7,168,074 B1
(45) Date of Patent: ***Jan. 23, 2007

(54) RUNTIME PREDICTION FRAMEWORK FOR CPU INTENSIVE APPLICATIONS

(75) Inventors: Ganapati Srinivasa, Portland, OR (US); Hemanth Kumar, Portland, OR (US); Donald Pearson, Hillsboro, OR (US); Mysore Sriram, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 617 days.

This patent is subject to a terminal disclaimer.

(21) Appl. No.: 09/675,286

(22) Filed: Sep. 29, 2000

(51) Int. Cl.
*G06F 9/46* (2006.01)
*G06F 9/44* (2006.01)
*G06Q 99/00* (2006.01)
*G09G 5/00* (2006.01)

(52) U.S. Cl. .................. 718/100; 705/52; 717/100; 345/619

(58) Field of Classification Search ............... 709/100, 709/102, 104, 105, 200–203; 705/51–52, 705/16, 20; 345/426, 418, 744, 748, 749, 345/751, 619; 718/100, 102, 104, 105; 717/100
See application file for complete search history.

(56) References Cited

U.S. PATENT DOCUMENTS

| | | | | |
|---|---|---|---|---|
| 5,739,820 A | * | 4/1998 | Lyon | 345/426 |
| 5,854,752 A | * | 12/1998 | Agarwal | 716/7 |
| 6,072,479 A | * | 6/2000 | Ogawa | 707/104.1 |
| 6,336,087 B2 | * | 1/2002 | Burgun et al. | 703/15 |
| 6,362,836 B1 | * | 3/2002 | Shaw et al. | 345/744 |
| 6,456,286 B1 | * | 9/2002 | Arai et al. | 345/423 |
| 6,539,445 B1 | * | 3/2003 | Krum | 710/110 |
| 6,600,836 B1 | * | 7/2003 | Thyagarajan et al. | 382/239 |
| 6,618,046 B1 | * | 9/2003 | Srinivasa et al. | 345/418 |
| 6,684,255 B1 | * | 1/2004 | Martin | 709/231 |
| 6,897,857 B2 | * | 5/2005 | Srinivasa et al. | 345/419 |

* cited by examiner

*Primary Examiner*—Meng-Ai T. An
*Assistant Examiner*—Kenneth Tang
(74) *Attorney, Agent, or Firm*—Crystal D. Sayles

(57) ABSTRACT

A scaled-down representation of input to a compute-intensive application is created. A computing requirement based on the scaled-down representation is calculated. A turnaround time and an actual cost to a customer to run the compute-intensive application with the input, on one or more processors, based on the calculated computing requirement, is calculated and then sent to the customer.

18 Claims, 4 Drawing Sheets

RUNTIME PREDICTION FRAMEWORK FOR CPU INTENSIVE APPLICATIONS

BACKGROUND

The invention relates generally to a method and system for providing the actual cost to the customer for utilization of a CPU farm, prior to that utilization.

In recent times, photo-realistic computer generated images have come to play a familiar role in commercial film and television productions. Production studios use sophisticated, compute-intensive software packages such as Maya™ from Alias Wavefront Corp., RenderMan™ from Pixar Corp., or Mental Ray™ from Mental Images, Inc. to create (or render) these images. Compute-intensive applications are characterized by their heavy use of a computer's central processing units. Depending on the complexity of a scene, a single frame can take up to several hours to render on conventional computer hardware. Since there are 1,800 frames in one minute of film (30 frames-per-second times 60), rendering time can quickly become impractical.

Faced with this dilemma, a production studio can either invest in additional computer hardware or outsource the rendering to a company (known as a "CPU farm") that has ample computer resources. Because the hardware investment can be significant and because there is a need to keep computers free for normal operations, smaller production studios are turning to CPU farms for rendering. A CPU farm can include a single computer system, but typically farms employ large numbers of fast processors interconnected through high-speed networks. The farm processors can be physically at one location or can be geographically dispersed. By dividing the rendering task among a number of processors, the farm can render a sequence of frames in a fraction of the time that it would take a small production studio.

Currently, CPU farms do not have the ability to quote the actual cost of performing a rendering job. Instead, farms provide an estimated cost. For example, the Alternative Perspective Render Farm (www.ap3d.com) extrapolates the time required for rendering based on the rendering time of one or more exemplary frames chosen by the customer. The calculation is based on the speed of the production studio's computer, the time it takes to render the exemplary frames, and the number of farm processors hired. Another farm, The Diner, Inc. (www.dinerinc.com), bases its cost estimation on the number of frames to be rendered and the average rendering time per frame (also provided by the customer).

Typically, the actual cost is determined only after the farm has completed the rendering job. If the actual cost is greater than the estimated cost, the customer pays the difference. Without knowing the actual cost of rendering beforehand, customers may find it difficult to budget such expenditures.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

Referring to the figures, exemplary embodiments of the invention will now be described. The exemplary embodiments are provided to illustrate aspects of the invention and should not be construed as limiting the scope of the invention. The exemplary embodiments are primarily described with reference to diagrams. Depending upon the implementation, the corresponding apparatus element may be configured in hardware, software, firmware or combinations thereof.

Exemplary Computer Architecture

As discussed herein, a "system", such as the system for generating a scaled-down representation of a customer's data, or a system for calculating the turn-around time and actual cost to the customer to run a compute-intensive application on a CPU farm, may be an apparatus including hardware and/or software for processing data. The system may include, but is not limited to, a computer (e.g., portable, laptop, desktop, server, mainframe, etc.), hard copy equipment (e.g., printer, plotter, fax machine, etc.), banking equipment (e.g., an automated teller machine), and the like.

Figure 1:
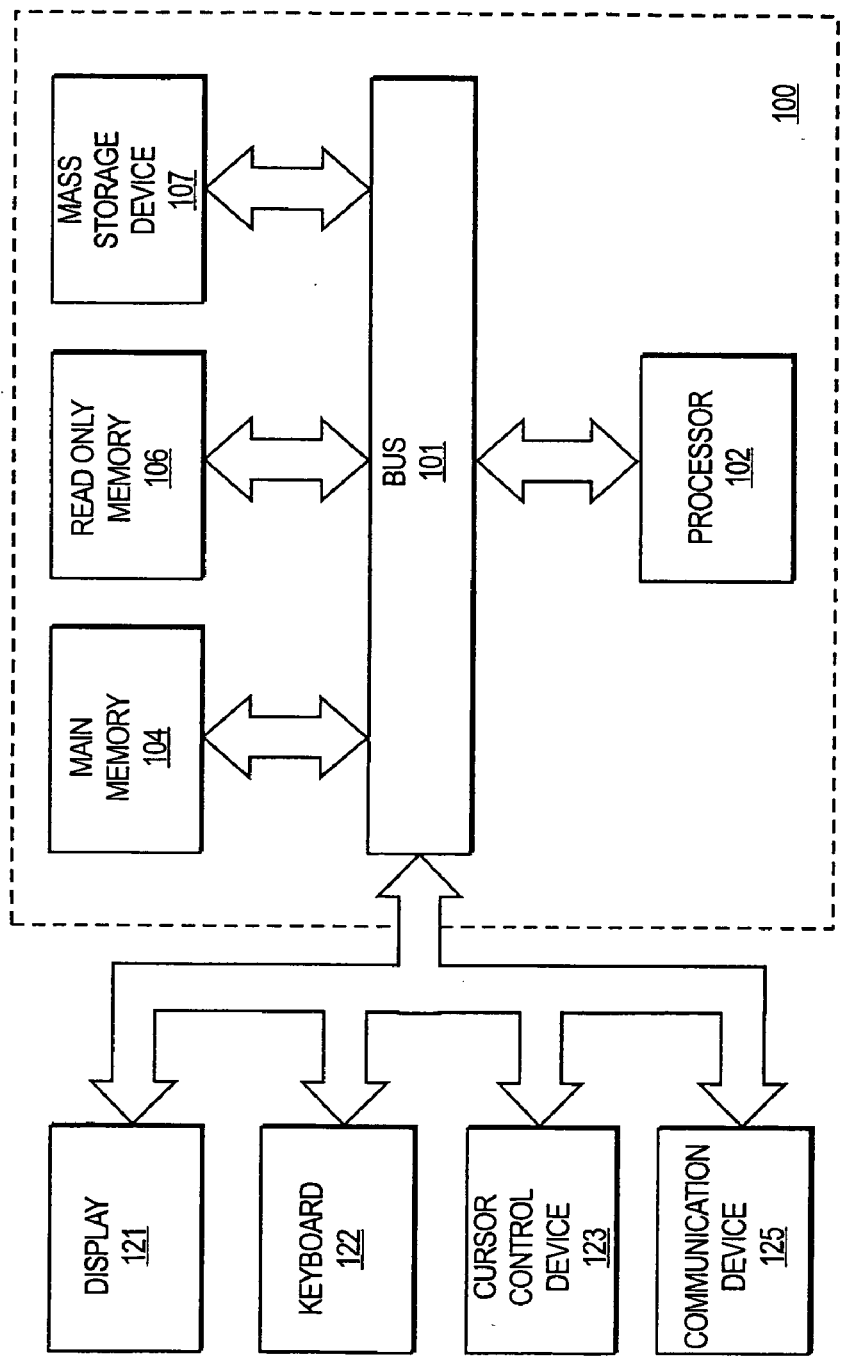
FIG. 1 depicts a block diagram of an exemplary computer system to implement certain embodiments of the present invention.

A computer system 100 representing an exemplary workstation, host, or server in which features of the invention may be implemented will now be described with reference to FIG. 1. The computer system 100 represents one possible computer system for implementing embodiments of the present invention, however other computer systems and variations of computer system 100 are also possible. The computer system 100 has a bus or other communications channel 101 for communicating information, and a processor 102 coupled with bus 101 for processing information. The computer system 100 further includes a random access memory (RAM) or other dynamic storage device 104 (referred to as main memory), coupled to the bus 101 for storing information and instructions to be executed by the processor 102. The main memory 104 also may be used for storing temporary variables or other intermediate information during execution of instructions by the processor 102. The computer system 100 also has a read only memory (ROM) and/or other static storage device 106 coupled to the bus 101 for storing static information and instructions for the processor 102.

A data storage device 107 such as magnetic disk, zip, or optical disc and its corresponding drive may also be coupled to the computer system 100 for storing information and instructions. The computer system 100 may also be coupled via the bus 101 to a display device 121, such as a cathode ray tube (CRT) or liquid crystal display (LCD), for displaying information to an end user. Typically, an alphanumeric input device such as a keyboard 122, including alphanumeric and other keys, may be coupled to the bus 101 for communicating information and/or command selections to the processor 102. Another type of user input device is a cursor control device 123, such as a mouse, a trackball, or cursor direction keys for communicating direction information and command selections to the processor 102 and for controlling cursor movement on the display 121.

A communication device 125 is also coupled to the bus 101. Depending upon the particular implementation, the communication device 125 may include a modem, a network interface card, or other well-known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

Exemplary CPU Farm

Figure 2:
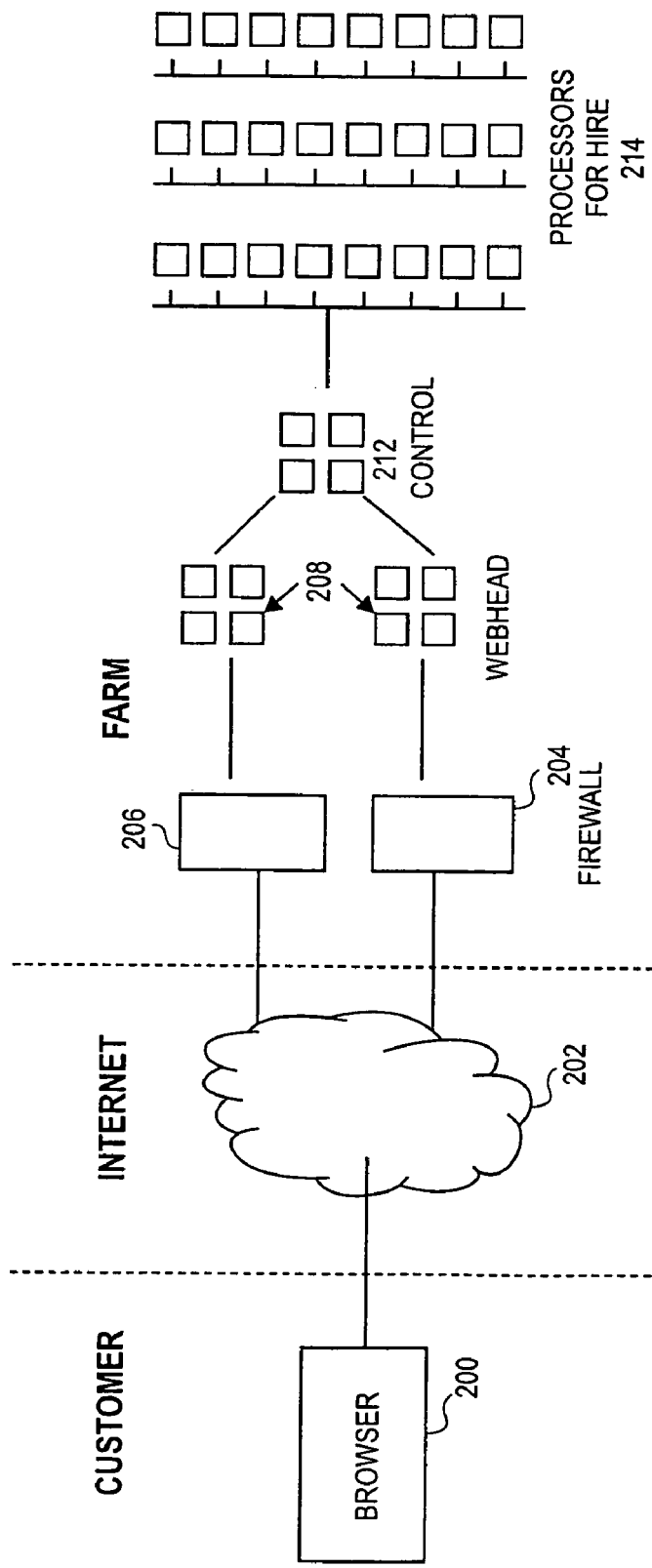
FIG. 2 depicts a high-level view of an embodiment of a CPU farm.

FIG. 2 depicts a high-level view of an embodiment of the exemplary CPU farm. The farm has one or more individual computer systems 214, also refered to here as 'processors for hire', that are connected by a network. The farm processors are hired by farm customers to execute compute-intensive applications. Scheduling the farm processors to perform customer work is handled by a farm control section 212, which can include one or more systems dedicated to managing the farm. Interaction with the customer, including providing quotes and accepting work orders, is facilitated by one or more servers, also referred to in this embodiment as a Web head 208.

The Web head 208 may consult with the farm control section 212 when providing cost and turn-around-time quotes to the customer. In addition, the Web head can include of one or more systems and can host one or more Web servers. The customer's computer system (or client) can run a Web browser 200 which can be used to communicate with the farm Web head 208. Communication with the farm can take place over the Internet, or any other wide area network 202. Interposed between the Web head and the Internet are one or more firewalls 204, 206.

In a typical transaction with the farm, a customer will use the Web browser 200 to contact the Web head 208 of the farm and submit a request to hire a number of farm processors 214 for running the customer's compute-intensive application. The farm may provide the customer a rough estimate on the cost to run the application. This estimate can be based on a number of factors, including the average frame processing time (as provided by the customer), the time it takes to render an exemplary frame (as provided by the customer), the number of frames, and the number of farm processors hired. Assuming the cost estimate is agreeable to the customer, the customer will then transfer any required input data files to the farm. The farm control section 212 will then schedule individual processors 214 to run the customer's application with the provided input data. Once the run is finished, the customer can retrieve the results via the Web head 208. If the actual time it took to run the customer's application was greater than the estimated time, the customer pays the difference.

Software Architecture

Figure 3:
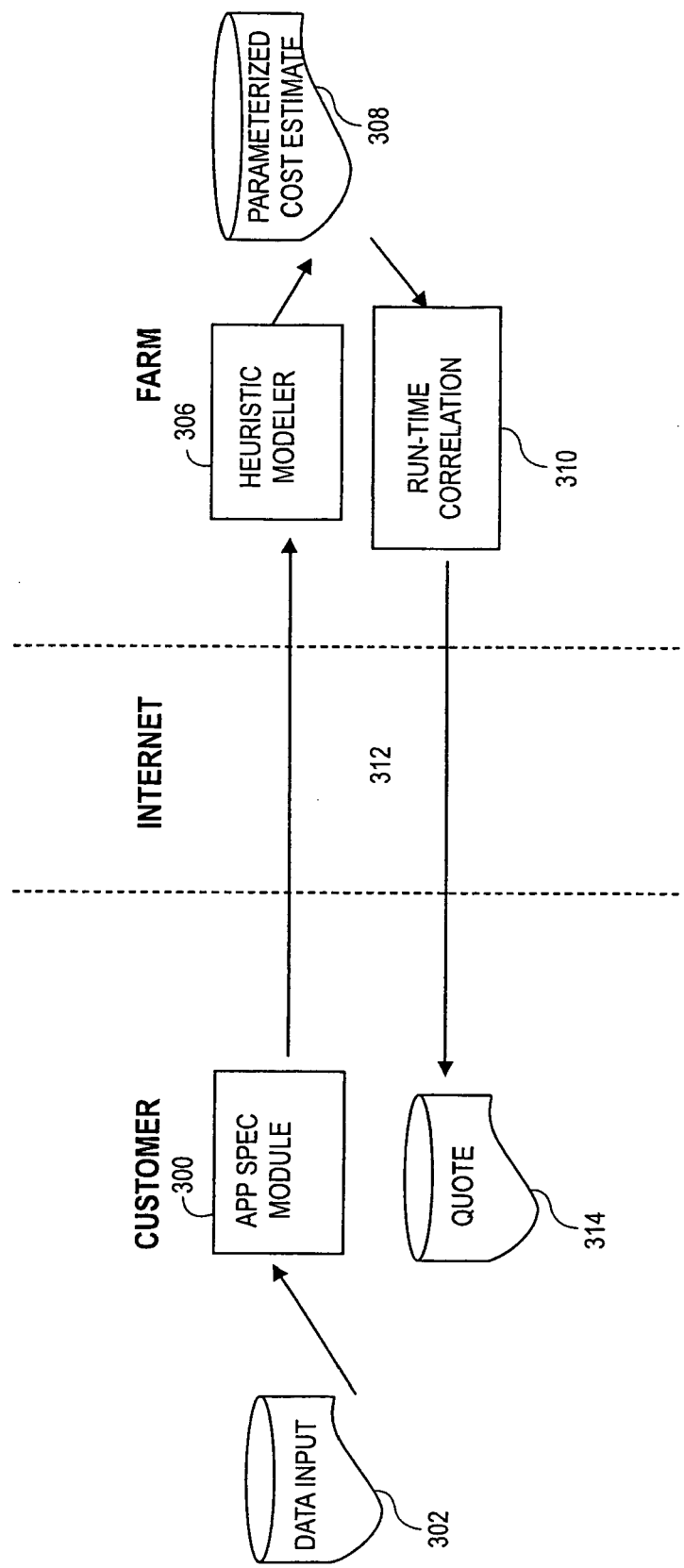
FIG. 3 depicts a software architecture for an embodiment of the method and system of the invention.
Figure 4:
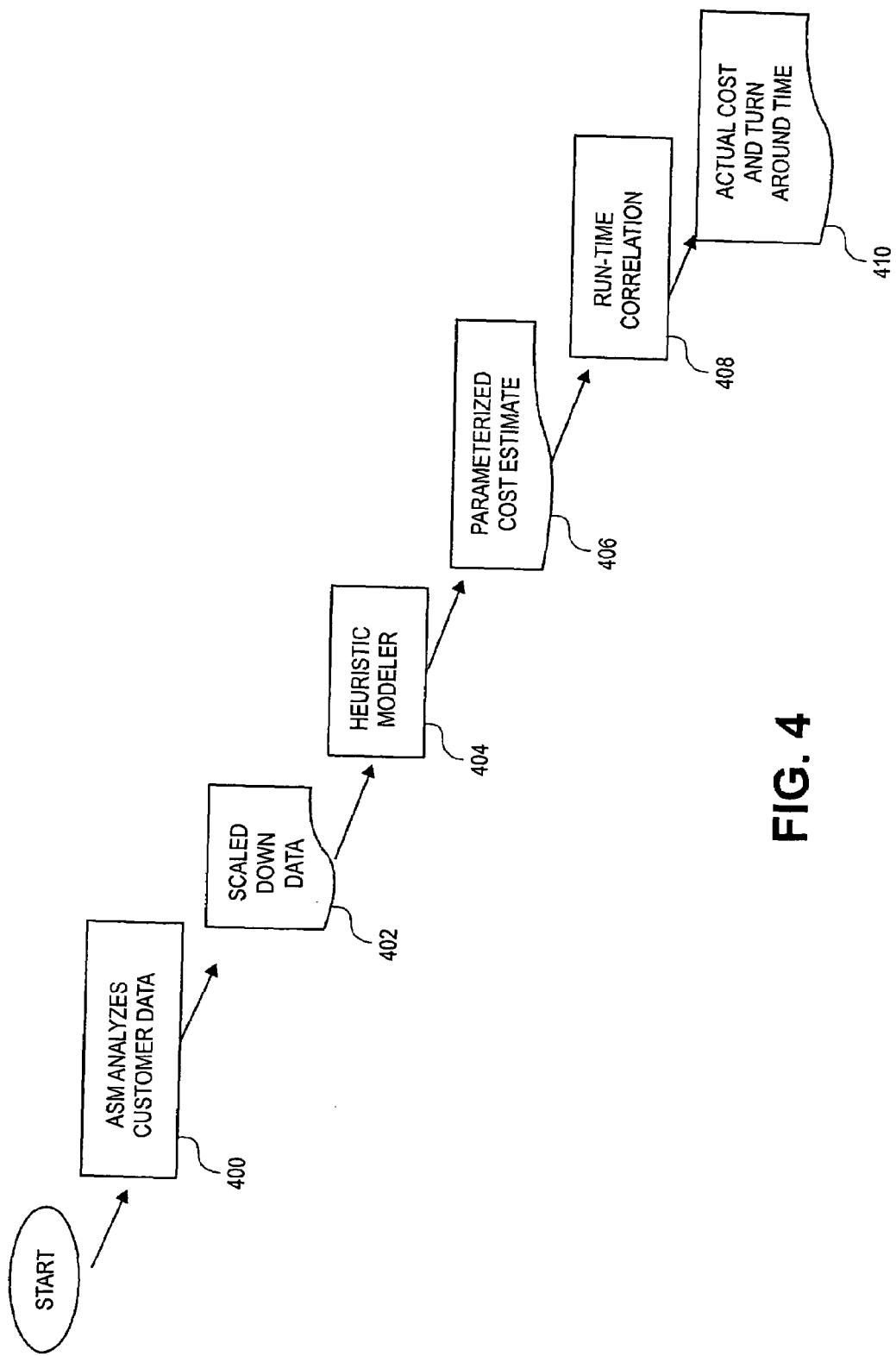
FIG. 4 illustrates a flow of operations for an embodiment of the invention's method.

FIG. 3 shows a diagram of a software architecture for and an embodiment of the invention. The process of providing an accurate price quote to the customer is illustrated as a flow diagram in FIG. 4. It begins with automatically analyzing the customer's input data on the customer's computer system using an Application-Specific Module (ASM) 300, as indicated by block 400. The ASM is tailored to a particular compute-intensive application. In this exemplary embodiment, the ASM is specific to a computer graphics rendering application, such as Maya™ or RenderMan™. However, the ASM 300 is not limited to computer graphics rendering applications. For example, the ASM could be tailored to an electronic logic simulator.

The ASM 300 scans the compute-intensive application's input data file(s) 302 and collects statistical information relevant to calculating the actual rendering time on the farm. This statistical information represents a scaled-down version of the application's input data, as referenced by block 402. Two kinds of data are collected from the input data files: scene description and render options. Many of these parameters are discussed in general reference or widely available computer graphics texts such as *Computer Graphics Principles and Practice*, by James D. Foley, Andries van Dam, Steven K. Feiner, and John F. Hughes, Addison-Wesley Publishing Company, 1996 (ISBN 0201848406). Others may be specific to certain graphics software packages, in which case they may be discussed in the documentation for that package.

The scene description is a three dimensional model of the graphic to be rendered. It includes the geometry that describes the objects in the scene as well as any lights that illuminate the scene, the number of triangles needed to represent the scene, textures, shading method, and a camera used to capture the scene in two dimensions. Lights may be provided in the three dimensional model to illuminate objects. Lights may have different colors, intensities, and directions. Objects may have reflective or absorptive properties for light. Textures and shading methods are used to create effects on the surfaces of objects. Shading methods can include flat, Gouraud, or Phong, for example. These elements are used to determine the base complexity (or base render time) of a render job.

The render options are the parameters that render engines use to improve the quality and speed of a render job. Some examples include resolution, ray-tracing, anti-aliasing, and motion-blur. Ray tracing simulates the path of a light ray as it is reflected and absorbed by objects in the image. Anti-aliasing refers to the process of reducing jagged distortions in curves and diagonal lines. Motion-blur is an effect that simulates a camera shutter remaining open for an extended period of time, giving objects the appearance of movement. As more options are selected, the scene's complexity, and hence render time, increases.

The scaled-down data is then transmitted over a computer network (e.g., the Internet) to the CPU farm. On the farm, a heuristic modeler 306 (also referenced as block 404 in FIG. 4) consumes the scaled-down data and calculates a computing time for the class of applications (e.g., rendering or logic simulation).

The computing time, also referred to as the parameterized cost 308 (also referenced as block 406 in FIG. 4), is a product of the base complexity, motion-blur/anti-aliasing heuristic, and the ray tracing heuristic. The base complexity is calculated using the number of triangles in the scene and the frame resolution (pixels). The motion-blur/anti-aliasing heuristic takes into account the additional time required to render frames using anti-aliasing and/or motion-blur algorithms. The ray tracing heuristic is a multiplier based on a linear relationship between the frame resolution and the number of light sources.

The run-time correlator 310 takes the computing time calculated by the heuristic modeler 306 and predicts, as referenced by block 408, the actual cost and turn-around time by taking into account the set of available processors, the processor speeds, and whether or not the customer needs the results as soon as possible. The actual cost and turn-around time 410 is then transmitted over a computer network 312 to the customer system as part of a quote 314. If the compute-intensive application is for graphics rendering, the cost could be in terms of cost per frame. Likewise, if the compute-intensive application is for logic simulation, the cost could be in terms of cost per gate.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:

analyzing application input data for a compute-intensive application on a computer system of a customer using an application-specific module, wherein the application-specific module scans the application input data and collects statistical information relevant to calculating a computing time on a CPU farm to determine costs to run the compute-intensive application using the application input data on the CPU farm, wherein the statistical information represents a scaled-down representation of the application input data;

receiving the scaled-down representation of the application input data over a computer network;

calculating a computing requirement based on the scaled-down representation;

calculating a turn-around time and an actual cost to a customer to run the compute-intensive application with the application input data, on one or more processors, based on the calculated computing requirement; and sending the turn-around time and the actual cost to the customer's client software.

2. The method of claim 1 wherein the compute-intensive application is to perform computer graphics rendering.

3. The method of claim 1 wherein the compute-intensive application is to perform logic simulation.

4. The method of claim 1 wherein the scaled-down representation of the application input data is generic to a class of applications.

5. The method of claim 1 wherein the scaled-down representation of the application input data includes the geometry, lights, number of triangles, textures, shading method, camera, ray-tracing, anti-aliasing, and motion-blur of an underlying scene.

6. The method of claim 1 wherein the turn-around time and actual cost are transmitted over an internet to the customer's client software.

7. The method of claim 1 wherein the compute-intensive application is to perform logic simulation and the actual cost is provided to the customer in terms of cost per logic gate.

8. The method of claim 1 wherein the compute-intensive application is to perform computer graphics rendering and the actual cost is provided to the customer in terms of cost per image frame.

9. A system having one or more processors for generating a rendering cost estimate, the system comprising:

an application-specific module to scan one or more input data files to a compute-intensive application and to collect statistical information relevant to calculating an actual computing time on a CPU farm to determine computing costs to run the compute-intensive application on the CPU farm;

a heuristic modeler module coupled to the output of the application-specific module, to calculate a computing requirement; and a run-time calculator module coupled to the output of the heuristic modeler module, to compute a turn-around time and an actual cost to run the application using the one or more input data files on the one or more processors, wherein the run-time calculator module provides the turn-around time and the actual cost to the customer's client software.

10. The system of claim 9 wherein the modules are to communicate with each other over an internet.

11. The system of claim 9 wherein the statistical information comprises a scaled-down representation of the input data files to include the geometry, lights, number of triangles, textures, shading method, camera, ray-tracing, anti-aliasing, and motion-blur of an underlying scene.

12. An article of manufacture comprising:

a machine readable medium containing instructions which, when executed by a processor, cause a machine to perform operations comprising:

analyzing application input data for a compute-intensive application on a computer system of a customer using an application-specific module, wherein the application-specific module scans the application input data and collects statistical information relevant to calculating a computing time on a CPU farm to determine costs to run the compute-intensive application using the application input data on the CPU farm, wherein the statistical information represents a scaled-down representation of the application input data;

calculating a computing requirement based on the scaled-down representation of application input data to the compute-intensive application to determine costs to run the compute-intensive application using the application input data;

calculating a turn-around time and an actual cost to the customer to run the compute-intensive application with the application input data, on one or more processors, based on the calculated computing requirement; and providing the turn-around time and the actual cost to the customer's client software.

13. The article of manufacture of claim 12 wherein the medium includes further instructions to create the scaled-down representation of the application input data as being generic to a class of applications.

14. The article of manufacture of claim 12 wherein the medium includes further instructions to create the scaled-down representation of the application input data as having the geometry, lights, number of triangles, textures, shading method, camera, ray-tracing, anti-aliasing, and motion-blur of an underlying scene.

15. The article of manufacture of claim 12 wherein the medium includes further instructions to enable the scaled-down representation of the application input data to be received over an internet from the client software.

16. The article of manufacture of claim 12 wherein the medium includes further instructions to enable the turn-around time and actual cost to be transmitted over the internet to the customer's client software.

17. The article of manufacture of claim 12 wherein the medium includes further instructions to calculate the actual cost in terms of cost per logic gate.

18. The article of manufacture of claim 12 wherein the medium includes further instructions to calculate the actual cost in terms of cost per image frame.

* * * * *